United States Patent [19]

Korver

[11] Patent Number: 5,174,731
[45] Date of Patent: Dec. 29, 1992

[54] METHOD AND ARRANGEMENT FOR CONTROLLING A COMPRESSED AIR-OPERATED DOUBLE DIAPHRAGM PUMP

[75] Inventor: Gerardus Korver, Aalten, Netherlands

[73] Assignee: DEPA Gesellschaft für Verfahrenstecnik mit berchränkter Haftung, Düsseldorf, Fed. Rep. of Germany

[21] Appl. No.: 458,517

[22] Filed: Dec. 28, 1989

[30] Foreign Application Priority Data

Jan. 12, 1989 [DE] Fed. Rep. of Germany ....... 3900718

[51] Int. Cl.$^5$ ........................ F04B 43/06; F01L 25/02
[52] U.S. Cl. ..................................... 417/393; 91/306; 91/275
[58] Field of Search ................. 417/393; 91/306, 313, 91/341, 275

[56] References Cited

U.S. PATENT DOCUMENTS

| | | | |
|---|---|---|---|
| 2,691,962 | 10/1954 | Johnson | 91/275 |
| 2,991,760 | 7/1961 | Rhine | 91/275 |
| 3,013,531 | 12/1961 | Mueller | 91/275 |
| 3,299,826 | 1/1967 | Williams | 417/395 |
| 3,304,126 | 2/1967 | Rupp | 91/275 |
| 3,421,448 | 1/1969 | Brewer | 91/275 |
| 3,489,063 | 1/1970 | Piret | 91/275 |
| 3,838,946 | 10/1974 | Schall | 91/313 |
| 4,328,950 | 5/1982 | Aspinwall | 251/297 |
| 4,381,180 | 4/1983 | Sell | |
| 4,555,222 | 11/1985 | Casilli | 417/393 |

FOREIGN PATENT DOCUMENTS

| | | |
|---|---|---|
| 1453607 | 10/1973 | Fed. Rep. of Germany . |
| 2726674 | 5/1978 | Fed. Rep. of Germany . |
| 2125138 | 12/1982 | Fed. Rep. of Germany . |
| 3150976 | 6/1983 | Fed. Rep. of Germany . |
| 3507011 | 10/1985 | Fed. Rep. of Germany . |
| 2103982 | 4/1972 | France . |
| 2396225 | 1/1979 | France . |
| 458860 | 8/1968 | Switzerland . |

*Primary Examiner*—Richard A. Bertsch
*Assistant Examiner*—Peter Korytnyk
*Attorney, Agent, or Firm*—Toren, McGeady and Assoc.

[57] ABSTRACT

A method and an apparatus for control of the movement of a control piston of an air control valve for a compressed air-operated double diaphragm pump, wherein the control piston is moved between the end positions in a control cylinder having inlet bores and outlet bores for the compressed air. The control piston is adjusted by a control medium. The method includes initially maintaining the control piston in an end position by a holding device against the pressure of the control medium for a predetermined period of time or until a counterpressure reaches a predetermined pressure level. Subsequently, the control piston is moved with a pushing force which is always greater than the maximum frictional forces. The holding device operates independently of the movement of the pump diaphragm, preferably using elastically, magnetically, or electromagnetically operating structural elements. The control cylinder includes separate connections for a control medium for moving the control piston.

7 Claims, 3 Drawing Sheets

METHOD AND ARRANGEMENT FOR CONTROLLING A COMPRESSED AIR-OPERATED DOUBLE DIAPHRAGM PUMP

BACKGROUND OF THE INVENTION

1. Field of the Invention

The present invention relates to a method for controlling the movement of a control piston of an air control valve for a compressed air-operated double diaphragm pump, wherein the control piston is moved between two end positions in a control cylinder having inlet bores and outlet bores for the compressed air.

The present invention further relates to an arrangement for carrying out the method for controlling a compressed air-operated double diaphragm pump.

2. Description of the Related Art

Compressed air-operated diaphragm pumps are particularly suitable for conveying in a problem-free manner very different media, including those which can be conveyed by other pump systems only with difficulties because they are pastes or powders or have abrasive properties. Diaphragm pumps have a very high technical reliability in demanding pump operation. Another advantage of such diaphragm pumps is that they do not have rotating components and require no shaft sealing members and are completely resistant to dry operation. The pump can be controlled in a simple manner by changing the amount of the compressed air supplied for operation without requiring expensive or complicated control drives.

Because of their many advantages compressed air-operated diaphragm pumps are used, for example, in the food industry for conveying tomato paste, animal food, chocolate mass, etc. or in the cosmetic industry for conveying toothpaste or creams. They can also be found in mining operations or in the construction industry for pumping from mines, for drainage, for ore preparation and for conveying gypsum sludges, asbestos cement sludges etc. Of course, the above-mentioned fields of use and media conveyed are only examples.

Among the components which are essential for the technological reliability and for the controllability of the double diaphragm pump is the air control valve which causes the respective chambers of the diaphragm pump to be subjected to compressed air in accordance with the required conveying capacity.

A compressed air-operated double diaphragm pump is known from German Offenlegungsschrift 31 50 967. This double diaphragm pump includes a pump housing with two housing chambers which are arranged next to each other and at a distance from each other. The housing chambers include a diaphragm arrangement and are divided by the latter into a pump chamber and an air chamber. The air chambers of the two housing chambers are directed toward each other and a compressed air reversing unit is arranged between the air chambers. The compressed air reversing unit conducts compressed air to the two air chambers and alternatingly discharges the air chambers, wherein the pump chambers are connected through valve devices with an intake piece and a pressure piece through which the material to be conveyed in the form of paste or powder is taken into the pump chamber due to the diaphragm movements generated by the compressed air or is forced out of the pump chamber. The compressed air reversing unit includes a valve control piston for reversing the air chamber connecting paths.

The valve control piston includes a mechanically operating drive system with a mechanical energy storing means, wherein the latter is actuated by the movement of the diaphragm arrangements. The energy storing means is formed by a compression spring arranged within the valve control piston. The compression spring is mechanically coupled to a spring-biased ball which locks the control piston in a predetermined end position and releases the control piston only when the compression spring has been pretensioned by the diaphragm arrangement to a predetermined potential energy. This construction causes the control system to be moved back and forth between two stable piston positions, so that staying of the reversing unit in an undefined intermediate position which in the past has been found disadvantageous is essentially avoided.

German Auslegeschrift 27 26 674 discloses a compressed gas-operated double diaphragm pump with two diaphragms which each are arranged in a chamber so as to divide the chamber into a drive chamber and a pump chamber. The diaphragms are connected to each other through a rigid coupling which causes a synchronous movement of the two diaphragms. The control valve includes a piston slide member with two ball locks, wherein the piston slide member is mechanically connected to the rigid coupling of the diaphragms. In the end positions of the piston slide member, a drive pressure gas is alternatingly supplied to one or the other drive chamber of the diaphragm pump. The mechanical connection and the mechanical drive between the rigid coupling of the diaphragms and the piston slide member of the control valves mounted in the pump housing is effected by means of a bar spring having a round or a flat cross-section. The bar spring engages in a lateral opening of the rigid coupling of the diaphragm and in an opening of the piston slide member and is pivotally mounted in an opening of a rib in the housing. Because of the short mechanical coupling between the diaphragm coupling and the piston slide member by means of the bar, the control valve can be arranged in the pump housing. The bar spring is dimensioned such that the ball locks are overcome in the end position of the control valve and, thus, a snap switch is formed for the piston slide member.

German Auslegeschrift 1,453,607 describes a hydraulically operated double diaphragm pump with two diaphragms. Each of the diaphragms is arranged in a chamber and divides the chamber into a pump chamber and a drive chamber. The diaphragms are connected to each other through a rigid coupling which causes a synchronous movement of the two diaphragms. The pump is further connected to a control valve constructed as a piston slide member which is mechanically connected to the rigid coupling of the diaphragms, so that, in the end positions of the movement of the diaphragms, a drive liquid is alternatingly conducted into one and then the other of the drive chambers. The mechanical connection between the rigid diaphragm coupling and the control valve is effected by means of an arm fastened to the rigid coupling. The arm is slidingly guided on an actuating rod connected to the piston slide member. A spring is arranged on both sides of the arm, wherein the travel stroke of the springs is dimensioned in such a way that the two springs are continuously in work connection with the arm. The control piston of the control valve includes two ball locks as locking devices which are released when a certain force exerted by the two springs is applied and cause the valve to be reversed.

As a result, a movement of the diaphragm is achieved up to a desired point at which the diaphragm movement is suddenly interrupted and the opposite stroke is initiated.

The above-described double diaphragm pumps have in common that the movement of the valve control piston is mechanically controlled by the diaphragms which are rigidly connected to each other and that by utilizing a potential spring energy a snap-type device is formed which moves the control piston of the valve back and forth between two end positions. However, the control valves also have in common that they are structurally complicated and that, when the pump capacity is very low, the control valve has the tendency to be caught in an intermediate position and that, when the pump capacity is very high, an exact control of the valve is not possible because of a so-called fluttering of the spring mechanism.

It is, therefore, the primary object of the present invention to simplify the control and the control mechanism of the air control valve for a compressed air-operated double diaphragm pump and to control the movement of the control piston without a mechanical coupling to the pump diaphragm, so that a secure and exact reversal of the control valve is ensured even if the pump operates very slowly or with a very high capacity.

SUMMARY OF THE INVENTION

The method for controlling a compressed air-operated double diaphragm pump according to the present invention includes the steps of adjusting the control piston by a control medium, preferably control air, and initially maintaining the control piston in its end or reversing position by a holding device against the pressure of the control air for a predetermined period of time or until a counterpressure reaches a predetermined pressure level, and subsequently moving the control piston with a pushing force which is always greater than the maximum occurring frictional forces, wherein the holding device operates independently of the movement of the pump diaphragm, preferably by means of elastically, magnetically, or electromagnetically operating structural elements.

The arrangement for controlling a compressed air-operated double diaphragm pump according to the present invention includes at the control cylinder of the air control valve separate connections for a control medium, preferably for control air for adjusting the control piston, and a holding device which is operated uncoupled from the pump diaphragm and is in operative connection with the control piston, wherein the holding device counteracts the pressure of the control air at least for a defined period of time and/or until a defined pressure is reached.

The solution according to the present invention provides the advantage that it is not necessary to use complicated and expensive structural components which were used in the past and are susceptible to trouble. The control of the valves can be essentially uncoupled from the movement of the pump diaphragms, so that a better adjustment of the valve control to the respective operating points of the pump is made possible. Particularly when the pump is operated very slowly, an exactly metered supply of the control air in connection with the adjusted holding time of the holding device or in connection with the adjusted counterpressure of the holding device makes it possible that the reversal of the valve can be delayed until the respective diaphragm chamber of the pump is completely filled with the pressurized operating air. Thus, when the holding force of the holding device is overcome by a supply of a predetermined amount of air, the pushing force exerted by the control air onto the control piston can be adjusted to levels which are always greater than the frictional forces occurring in the valves.

It is safely prevented that the control piston gets caught in a middle position and a resulting pump standstill is avoided. Even at very high pump capacities, the measures according to the present invention make possible an extremely exact control of the valve, so that the two air chambers of the diaphragm pump are supplied with pressurized operating air in an optimum manner even if the quantities and levels of air to be conveyed alternately and are extremely high.

In accordance with a further development of the present invention, the holding time or the counterpressure of the holding device is variably adjustable, so that it is even better possible to take into consideration the operating conditions of the pump and the frictional conditions in the valve.

In accordance with a particularly advantageous feature of the present invention, at least one permanent magnet is arranged as the holding device at each end or reversing position of the control piston. As a result, a particularly simple structure is provided for the delayed locking of the control piston in the respective end positions. In accordance with another useful feature, one of the permanent magnets may be connected to the control surface of the piston and the other permanent magnet may be connected to the inner surface at the end face of the control cylinder, particularly if the cylinder housing is made of a plastics material.

In accordance with another feature of the invention, an electromagnetic holding device is arranged at each end for reversing position of the control piston. Each electromagnetic holding device includes a current-carrying coil embedded in or on the control cylinder, wherein the coil magnetically interacts with a ferromagnetic ring embedded in the control piston. This makes it possible to vary and control the holding time or the counterpressure of the holding device within wide ranges. As a result, the operation of the control valve can be adjusted in an optimum manner to the operating condition of the diaphragm pump, particularly if, in accordance with another proposal of the invention, the magnetic flux of the coil is adjustable by means of a freely programmable control unit.

In accordance with a preferred and particularly inexpensive construction of the air control valve, the control piston includes a piston rod with a middle guide piston and two outer piston surfaces with annular spaces arranged therebetween. The control piston is surrounded by the control cylinder. The surfaces of the control cylinder at the end faces receive the connections for the control air which, in turn, are connected to pilot valves. The compressed air connection is arranged at the outer circumference of the control cylinder and two compressed air discharge lines which lead to the double diaphragm pump are arranged at the outer circumference of the control cylinder. The control piston is movable in such a way that a compressed air line and a compressed air discharge line each can be connected to each other by means of the annular spaces. At least one permanent magnet is arranged on each of the piston surfaces to which control air is admitted.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENTS

Figure 1:
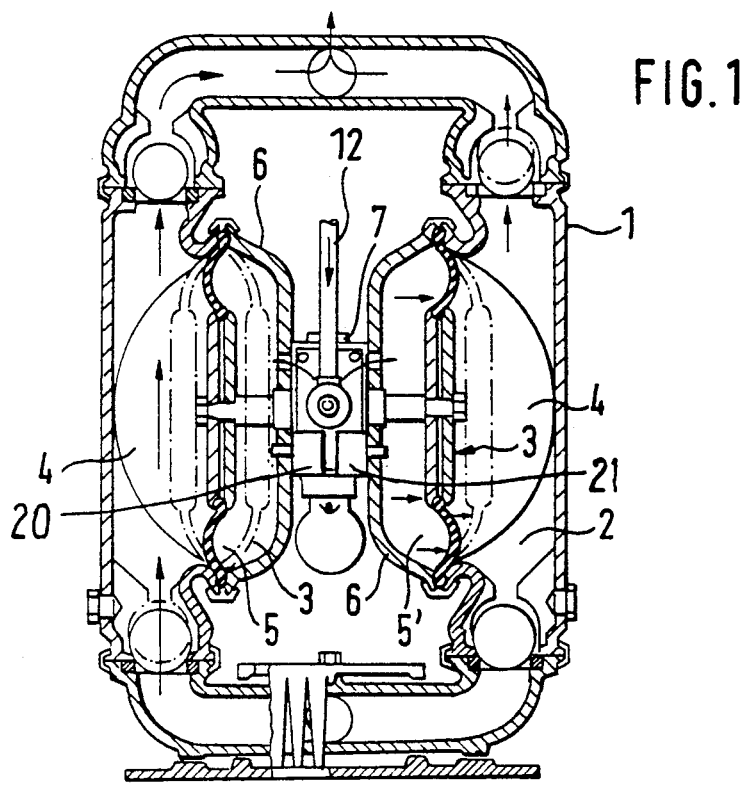
FIG. 1 is a sectional view of a compressed air-operated double diaphragm pump of known construction.

FIG. 1 of the drawing is a schematic sectional view of a compressed air-operated double diaphragm pump. The double diaphragm pump includes a pump housing 1 with two housing chambers 2 which are arranged next to each other and at a distance from each other. Each housing chamber 2 has a diaphragm 3 and is divided by this diaphragm 3 into a pump chamber 4 and an air chamber 5. The two air chambers 5, 5' are arranged facing each other. A compressed air reversing valve 7 with a compressed air supply line 12 is arranged between the outer walls 6 of the air chambers 5, 5'. The compressed air reversing valve 7 serves to distribute the compressed operating air to the two air chambers 5, 5'.

Figure 2:
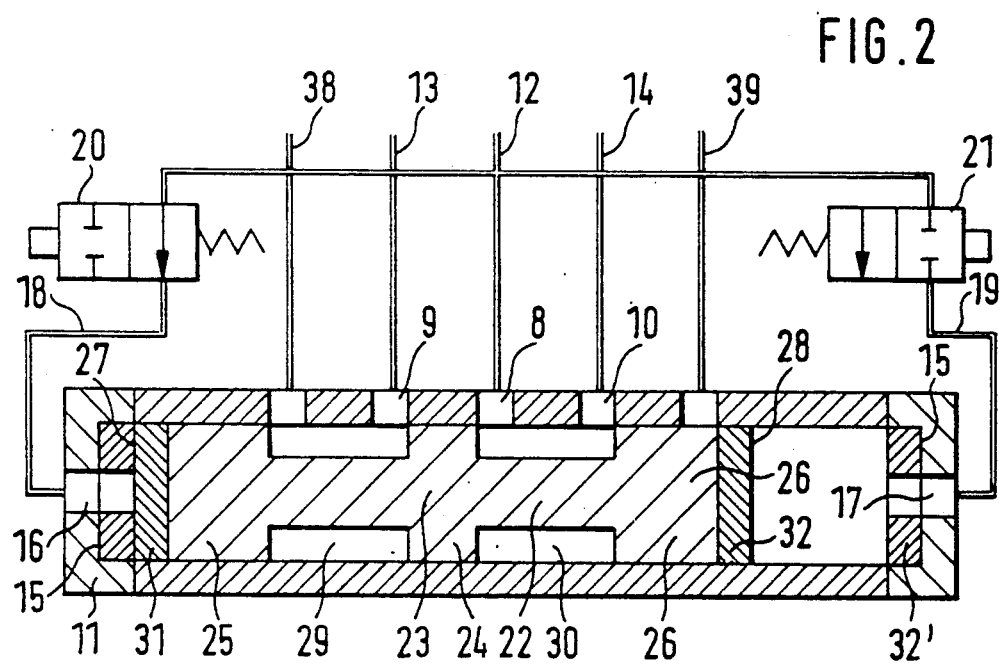
FIG. 2 is a schematic sectional view of the control valve of the double diaphragm pump with permanet magnets as holding device.

FIG. 2 of the drawing shows schematically the air control valve according to the present invention. The valve includes a control cylinder 11 with a compressed air connection 8 with a compressed air supply line 12 arranged on the outer circumference of the control cylinder and, also arranged on the outer circumference, with air discharge bores 9, 10 with compressed air discharge lines 13, 14 which lead to the left and the right air chamber 5, 5', respectively, of the diaphragm pump. At the end faces 15 of the control cylinder 11 are provided connections 16, 17 for the control air which are connected through a supply line 18, 19 to a pilot valve 20, 21.

Figure 5:
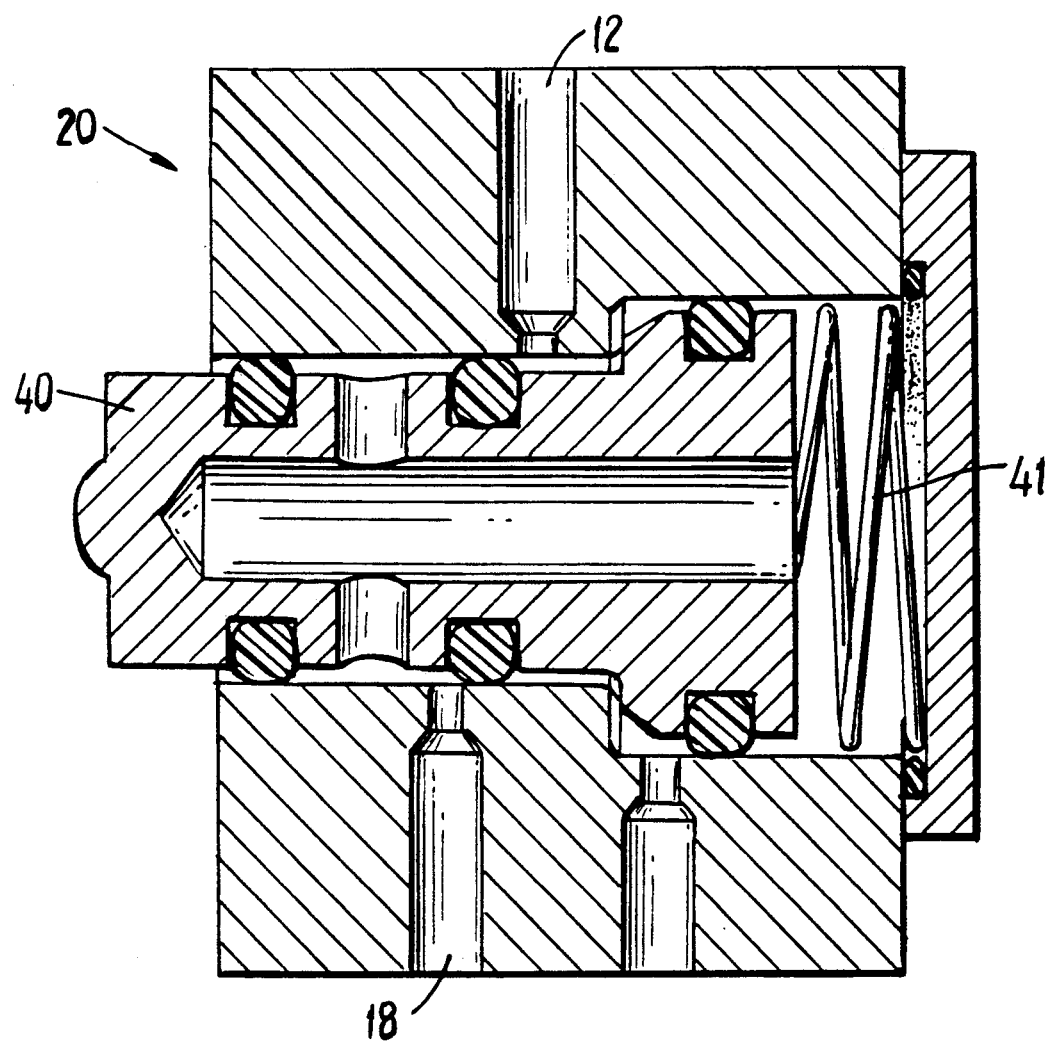
FIG. 5 is a sectional view of the double diaphragm pump.

As shown in FIG. 5, each pilot valve 20, 21 is a tappet-operated 3/2-way valve with a spring for returning the tappet. Thus, the spring 41 of the valve maintains the tappet 40 in the position of rest. The tappets 40 of the pilot valve 20 and 21 are actuated directly by the diaphragm plate of the double diaphragm pump. The manner of mounting the pilot valves 20, 21 in the double diaphragm pump is illustrated in FIG. 1.

The control piston 22 in the control cylinder 11 includes piston rod 23 with a middle guide piston 24 and two outer pistons 25, 26 with piston surfaces 27, 28. Two annular surfaces 29, 30 are warmed between the outer piston surfaces and the middle guide pistons. As can be seen from the drawing, when the control piston 22 is in the left end position thereof in the control cylinder 11, the compressed air connection 8 is connected through the annular space 30 to the compressed air discharge line 14 to the air chamber 5' of the diaphragm pump. As can also be easily recognized, when the control piston 22 is in the right end position thereof, the compressed air connection 8 is connected through the second annular space 29 to the compressed air discharge line 13 which leads to the air chamber 5 of the diaphragm pump. A permanent magnet 31, 32 each is mounted on the piston surface of the control piston 27, 28 to which control air is admitted. The permanent magnets 31, 32 magnetically interact with the cylinder housing 11 which is of a magnetizable material. The control cylinder 11 further includes the two discharge air lines 38, 39.

When the pilot valve 20 is controlled and opened for the control air, pressure is applied to the piston surface 27 of the control piston 22 until the magnetic force between piston surface 27 and end face 15 of the control cylinder is overcome and the piston is accelerated by the control air and the piston is suddenly moved into the other end position. Because of the high movement impulse, the frictional forces between piston and cylinder are overcome in all cases and the control piston does not assume an intermediate position within the control cylinder. The control piston 22 is subsequently rigidly locked in its other end position by means of permanent magnet 32. When control air is admitted to piston surface 28 of the control piston by controlling the pilot valve 21, the piston is initially held in its position by the permanent magnet 32 for a certain period of time until the pressure of the control air overcomes the magnetic force, so that the control piston is suddenly moved back into its first end position and is locked in this first end position by the permanent magnet 31. This movement impulse is so great that the frictional forces between control piston and control cylinder are overcome in all cases. Accordingly, the control piston is moved back and forth very quickly and very exactly between two defined end positions, so that a very exact filling of the air chambers 5, 5' of the diaphragm pump with compressed air is ensured even if the diaphragm pump operates under extreme operating conditions, for example, is operated very slowly or must produce very high delivery capacities.

If the control cylinder 11 consists for certain reasons of a plastics material, it is advantageous to connect a permanent magnet with a control surface of the piston and another permanent magnet 32' with the inner end face 15 of the control cylinder. Thus, a holding device is created which has the same advantageous properties as the above-described holding device in which the control cylinder 11 is of a metal material.

Figure 3:
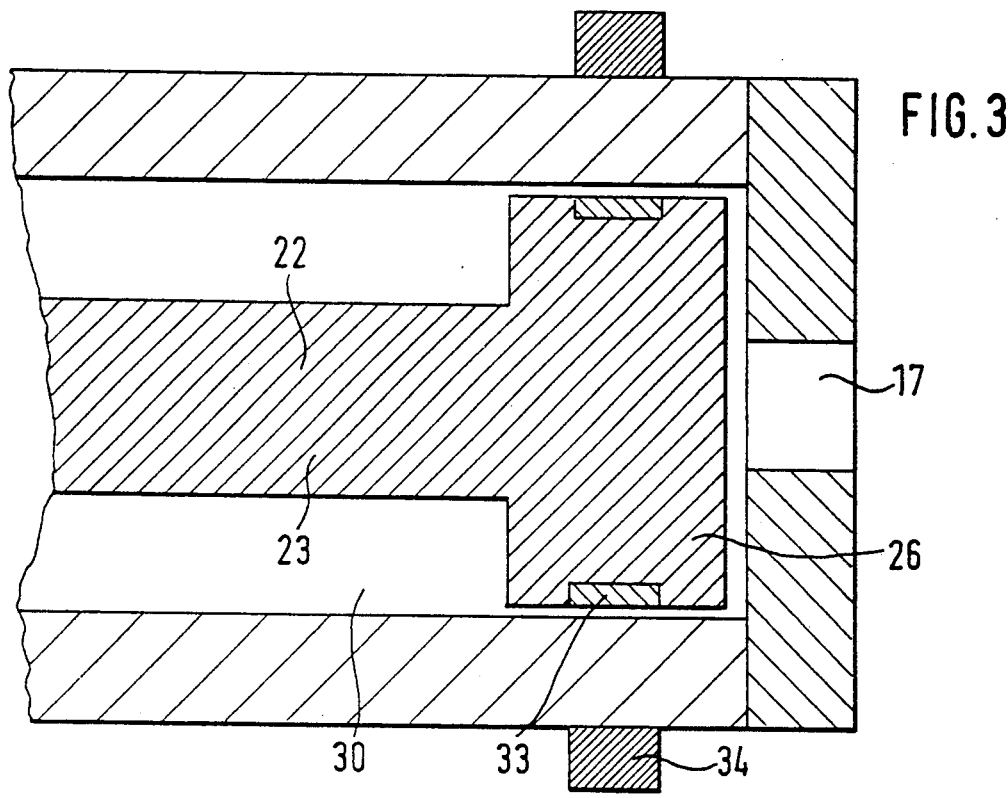
FIG. 3 is a partial sectional view, on a larger scale, of an electromagnetic holding device.

FIG. 3 of the drawing shows an electromagnetic holding device with a ferromagnetic ring 33 embedded in the control piston 22 and a circuit-carrying coil 34 arranged on the control cylinder 11. The magnetic flux of the coil 34 is adjustable by means of a control device which is not illustrated in detail but is equipped with conventional components. The holding force of this holding device which counteracts the pressure of the control air is freely adjustable with respect to time and magnitude in dependence on the operation of the pump, so that an excellent exact control of the valve and, thus, an optimum supply of compressed operating air into the air chambers 5, 5' of the pump is ensured. If the control cylinder is of a ferromagnetic material, the circuit-carrying coil should be arranged in the cylinder wall in such a way that the eddy current losses are as small as possible.

Figure 4:
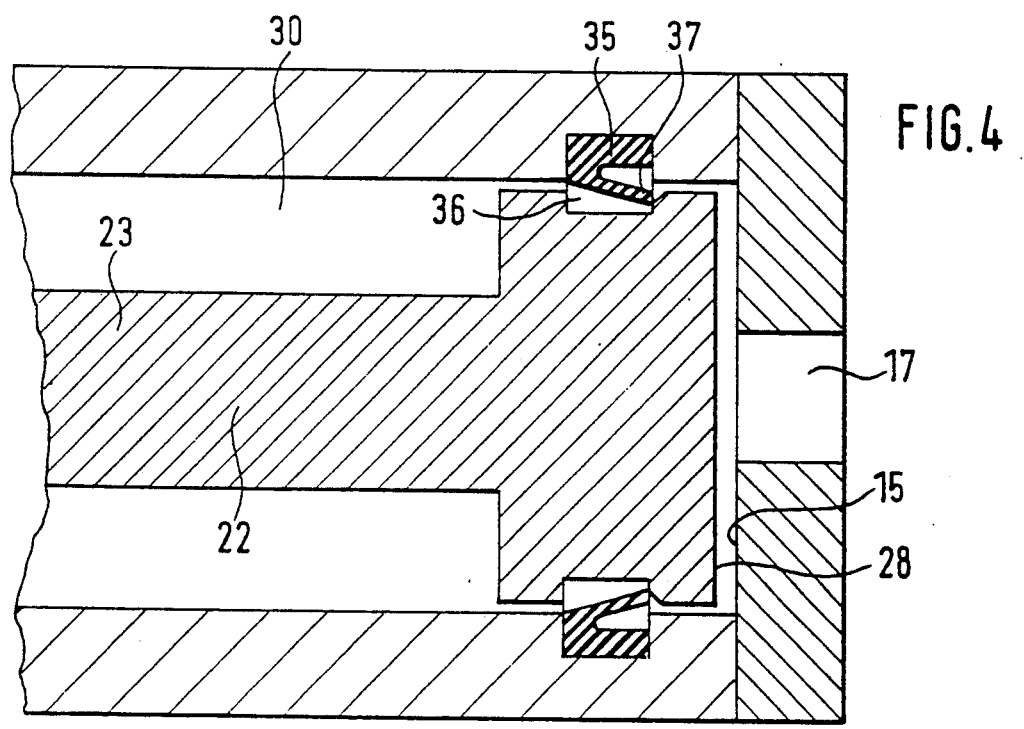
FIG. 4 is a partial sectional view, again on a larger scale, of the control valve with an elastic lip ring as holding device.

FIG. 4 shows a holding device for the control piston 22 which includes an elastic lip ring 35 in the control cylinder which interacts with an annular groove 36 at the piston circumference of corresponding construction. This holding device also very reliably meets the requirements of initially preventing the movement of the control piston in spite of the admission of control air and releases the piston only when the control air has reached a certain pressure. When this pressure is reached, the control piston is moved very quickly and with high accuracy into the other end position in the above-described manner by the slightly expanding control air. As schematically shown in the drawing, the lip ring 35 should be constructed in such a way that the elastic lip 37 provides little resistance to the control piston when it moves into its end position. However, when the control piston is moved out of its end position, the elastic lip 37 must provide holding forces which counteract the pressure of the control air. This can be achieved by an appropriate chamfering of the piston surface and the annular groove.

While specific embodiments of the invention have been shown and described in detail to illustrate the application of the inventive principles, it will be understood that the invention may be embodied otherwise without departing from such principles.

I claim:

1. In a method for controlling the movement of a control piston of an air control valve for a compressed air-operated double diapharagm pump, wherein the control piston is moved by means of a control medium between two end positions in a control cylinder having inlet bores and outlet bores for the compressed air, wherein the control medium is supplied to the control cylinder through pilot valves each of which is actuated only when one of the pump diaphragm is in an extreme position, and wherein the control piston is subjected in each of the two end positions thereof to a holding force to be overcome by the control medium, the improvement comprising applying the holding force in each of the two end positions of the control piston immediately at or in the vicinity of a piston surface within the control cylinder against the pressure of the control medium in front of a cylinder end face which contains a connection for the control medium for a predetermined period of time, increasing an adjusting force acting on the control piston within the control cylinder due to pressure applied by the control medium independently of the movement of the pump diaphragm to a value which exceeds the holding force.

2. The method according to claim 1, wherein the period of time for maintaining the control piston is variably adjustable.

3. In a method for controlling the movement of a control piston of an air control valve for a compressed air-operated double diaphragm pump, wherein the control piston is moved by means of a control medium between two end positions in a control cylinder having inlet bores and outlet bores for the compressed air, wherein the control medium is supplied to the control cylinder through pilot valves each of which is actuated only when one of the pump diaphragm is in an extreme position, and wherein the control piston is subjected in each of the two end positions thereof to a holding force to be overcome by the control medium, the improvement comprising applying the holding force in each of the two end positions of the control piston immediately at or in the vicinity of a piston surface within the control cylinder against the pressure of the control medium in front of a cylinder end face which contains a connection for the control medium until a counterpressure reaches a predetermined pressure level, and increasing an adjusting force acting on the control piston within the control cylinder due to pressure applied by the control medium independently of the movement of the pump diaphragm to a value which exceeds the holding force.

4. The method according to claim 3, wherein the counterpressure is variably adjustable.

5. The method according to claim 1 or 3, wherein the control medium is control air.

6. In a method for controlling the movement of a control piston of an air control valve for a compressed air-operated double diaphragm pump, wherein the control piston is moved by means of a control medium between two end positions in a control cylinder having inlet force and outlet force for the compressed air, wherein the control medium is supplied to the control cylinder through pilot valves each of which is actuated only when one of the pump diaphragms is in an extreme position, and wherein the control piston is subjected in each of the two end positions thereof to a holding force to be overcome by the control medium, the improvement comprising electromagnetically applying the holding force in each of the two end positions of the control piston immediately at or in the vicinity of piston surface within the control cylinder for a predetermined period of time, and one of increasing an adjusting force acting on the control piston within the control cylinder due to pressure applied by the control medium independently of the movement of the pump diaphragm to a value which exceeds the holding force and adjusting the electromagnetic holding force.

7. In a method for controlling the movement of a control piston of an air control valve for a compressed air-operated double diaphragm pump, wherein the control piston is moved by means of a control medium between two end positions in a control cylinder having inlet force and outlet force for the compressed air, wherein the control medium is supplied to the control cylinder through pilot valves each of which is actuated only when one of the pump diaphragms is in an extreme position, and wherein the control piston is subjected in each of the two end positions thereof to a holding force to be overcome by the control medium, the improvement comprising electromagnetically applying the holding force in each of the two end positions of the control piston immediately at or in the vicinity of a piston surface within the control cylinder until a counterpressure reaches a predetermined pressure level, and one of increasing an adjusting force acting on the control piston within the control cylinder due to pressure applied by the control medium independently of the movement of the pump diaphragm to a value which exceeds the holding force and adjusting the electromagnetic holding force.

* * * * *